June 15, 1926.
E. J. BABBITT
ARTIFICIAL BAIT
Filed Sept. 28, 1925
1,588,690
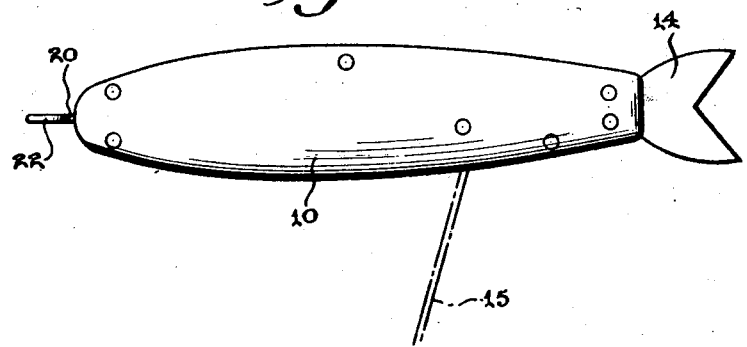
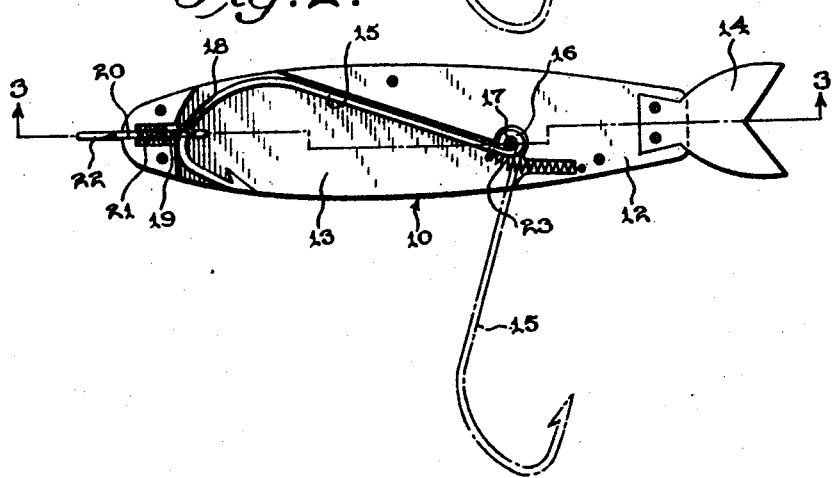
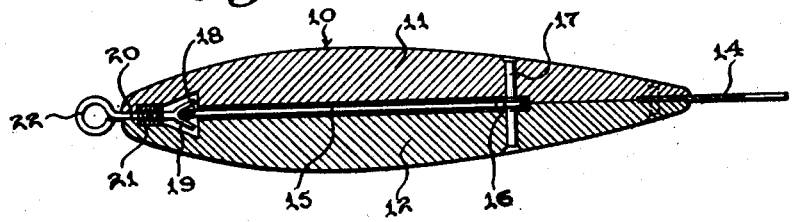
WITNESSES
H. A. La Clair
INVENTOR
E. J. Babbitt
BY Munn &co.
ATTORNEYS Patented June 15, 1926.

1,588,690

UNITED STATES PATENT OFFICE.

ELWIN J. BABBITT, OF HOLLAND, MICHIGAN.

ARTIFICIAL BAIT.

Application filed September 28, 1925. Serial No. 59,190.

My present invention relates generally to artificial bait, and more particularly to a bait of this type adapted alike for trolling, casting, and still fishing, my primary object being the provision of an artificial minnow or frog fish bait whose size, shape and color may be readily varied, and whose use is especially effective by virtue of its adaptability of movement through weeds and other water plants without catching.

A still further object is the provision of an artificial bait which will not only avoid the present difficulties with respect to the catching of weeds, but may also be used without the ordinary outstanding hooks and thus without frightening the fish.

In the accompanying drawing which illustrates my present invention and forms a part of this specification, Figure 1 is a side view of the artificial bait embodying my invention, Figure 2 is a side view with one section of the body removed, and Figure 3 is a longitudinal section taken substantially on the line 3—3 of Figure 2.

Referring now to these figures, my invention proposes an artificial bait including a body 10 formed of two connected sections 11 and 12, whose inner faces are cut away to provide an enlarged body slot 13 between the ends of the body. One end of the body may have the tail extension 14 and the other end thereof is provided with an axial opening whose inner end communicates with the slot 13.

Normally mounted within the slot 13 is a hook 15, the end of whose shank is provided with an eye 16 around a transverse pin 17 of the body 10, whereby to constitute a pivot pin which the hook 15 as a whole is swingable into and out of the body 10 between the positions shown in full and dotted lines in Figure 2.

Adjacent to its opposite end the hook 15 is provided with an annular rib 18 constituting a stop member and adjacent to this rib or stop member the hook is normally engaged by the forked inner end 19 of a trigger 20 in the form of a rod extending through the axial end opening of the body. This trigger rod is normally forced inwardly so as to hold its forked end 19 against the hook by virtue of a trigger control spring 21, and the outer or external end of the trigger rod has a line attaching eye 22.

Adjacent to its pivoted end 16, the hook 15 is engaged by one end of a hook actuating spring 23 whose opposite end is anchored within the body 10, and it is thus apparent with the parts in the normal or latched position shown in full lines in Figure 2, the artificial bait may be used in trolling, casting or still fishing without danger of catching weeds or water plants, or snagging on rocks or submerged trees, such as so commonly occurs with artificial bait having exposed external hooks as is ordinarily the case.

The parts of my improved bait are so arranged and related that the bait moves freely through the water with its hook housed and concealed in the body until it is struck or otherwise deflected, as for instance by the grasp of a fish in the water, whereupon the pull on the body 10 against the resistance of the line attached to the eye 22 results in the lengthwise movement of the trigger rod 20 against the tension of its spring 21.

This movement withdraws the forked end 19 of the trigger from engagement with the hook 15, freeing the latter for swinging movement outwardly to its effective position shown in dotted lines in Figures 1 and 2 by virtue of the actuating spring 23. In the above respects, my invention obviously improves the ordinary artificial bait, and while I have shown the same as including but a single hook, it is obvious that a plurality of hooks may be employed and provision made for their simultaneous release by the shifting of the single trigger 20.

I claim:—

1. An artificial bait including a body having a lengthwise slot intermediate its ends and an axial opening at its forward end communicating with said slot, a hook pivoted at one end in the slot of the body for swinging movement externally of the body and having a stop member near its opposite end, a trigger shiftable in the axial opening, having a fork at its inner end engageable with the hook adjacent to its stop member whereby to normally hold the hook in housed position within the body and also having a line attaching member at its outer end, spring means normally holding the trigger in its inner effective position, and spring means engaging the hook for swinging the same externally of the body when the trigger is released therefrom.

2. Artificial bait including a body having a lengthwise slot intermediate its ends and having an axial opening through its forward end communicating with said slot, a hook pivotally mounted within the slot of the body, means normally holding the hook in the slot of the body including a trigger member shiftable within the axial opening, having spring means normally holding the same in engagement with the hook and having line attaching means at its outer end externally of the body, and spring means within the body engaging the hook whereby to swing the latter externally of the body when the trigger is released from the hook.

3. An artificial bait having a slotted body, a spring actuated hook pivotally connected to the body and normally housed within the slots of the body, said hook having a stop member, and a spring controlled trigger having line attaching means at its outer end and having means at its inner end normally engaging the hook to hold the latter within the slot of the body.

ELWIN J. BABBITT.